July 8, 1941.  P. F. SKOOG  2,248,311
CAN FILLING MACHINE
Filed June 27, 1939   5 Sheets-Sheet 4
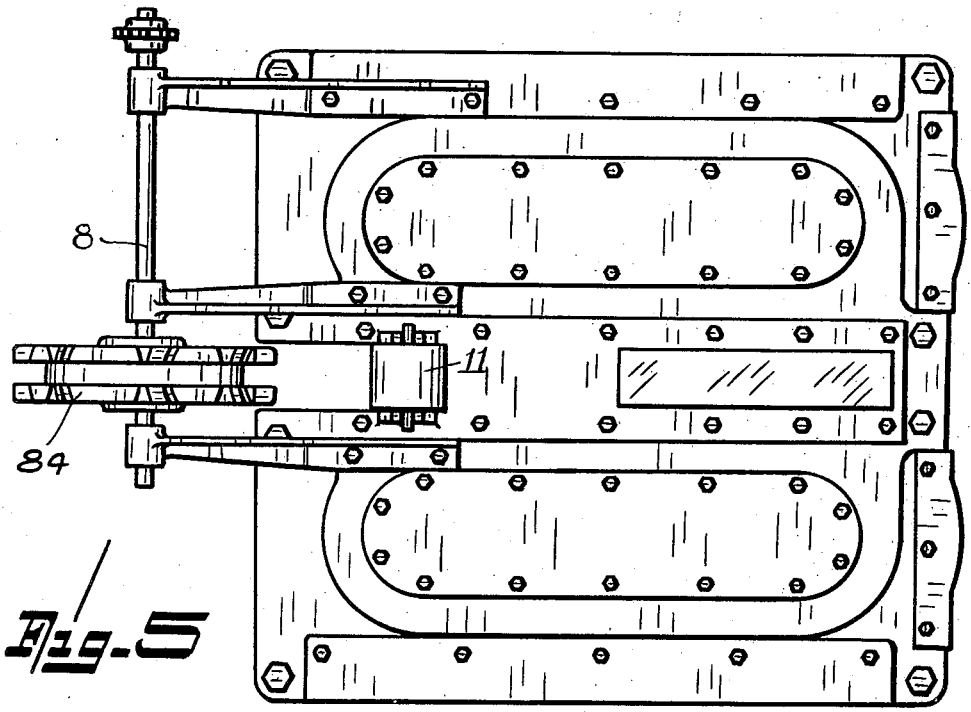
Fig. 5
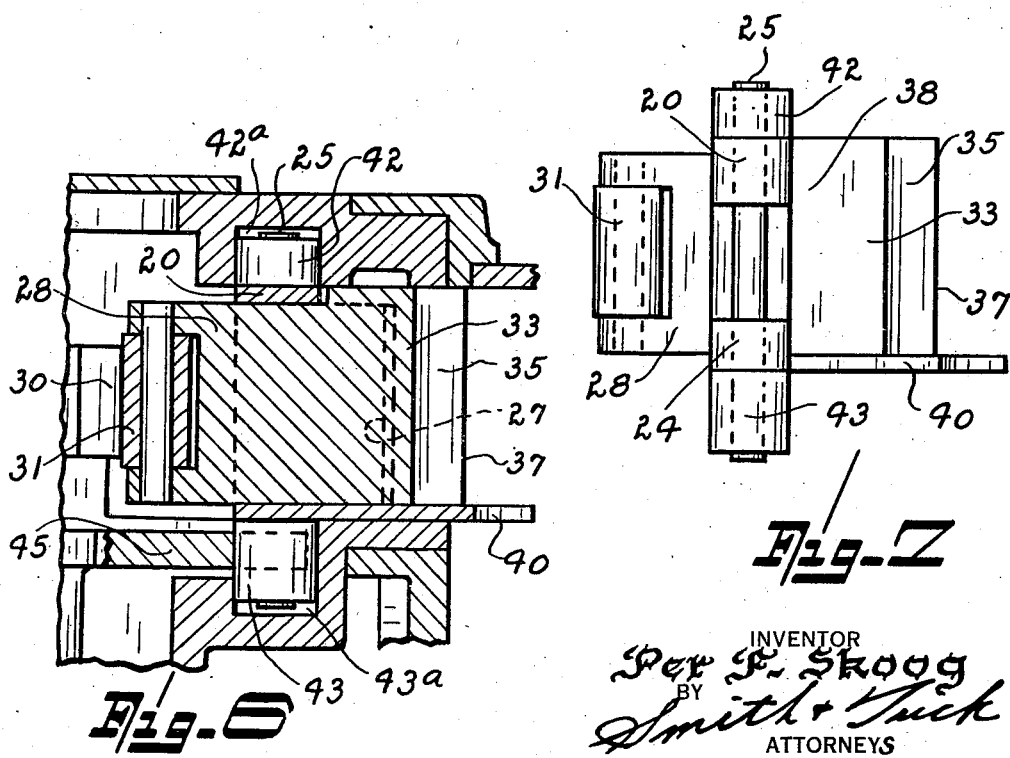
Fig. 6
Fig. 7
INVENTOR
Per F. Skoog
BY Smith + Tuck
ATTORNEYS

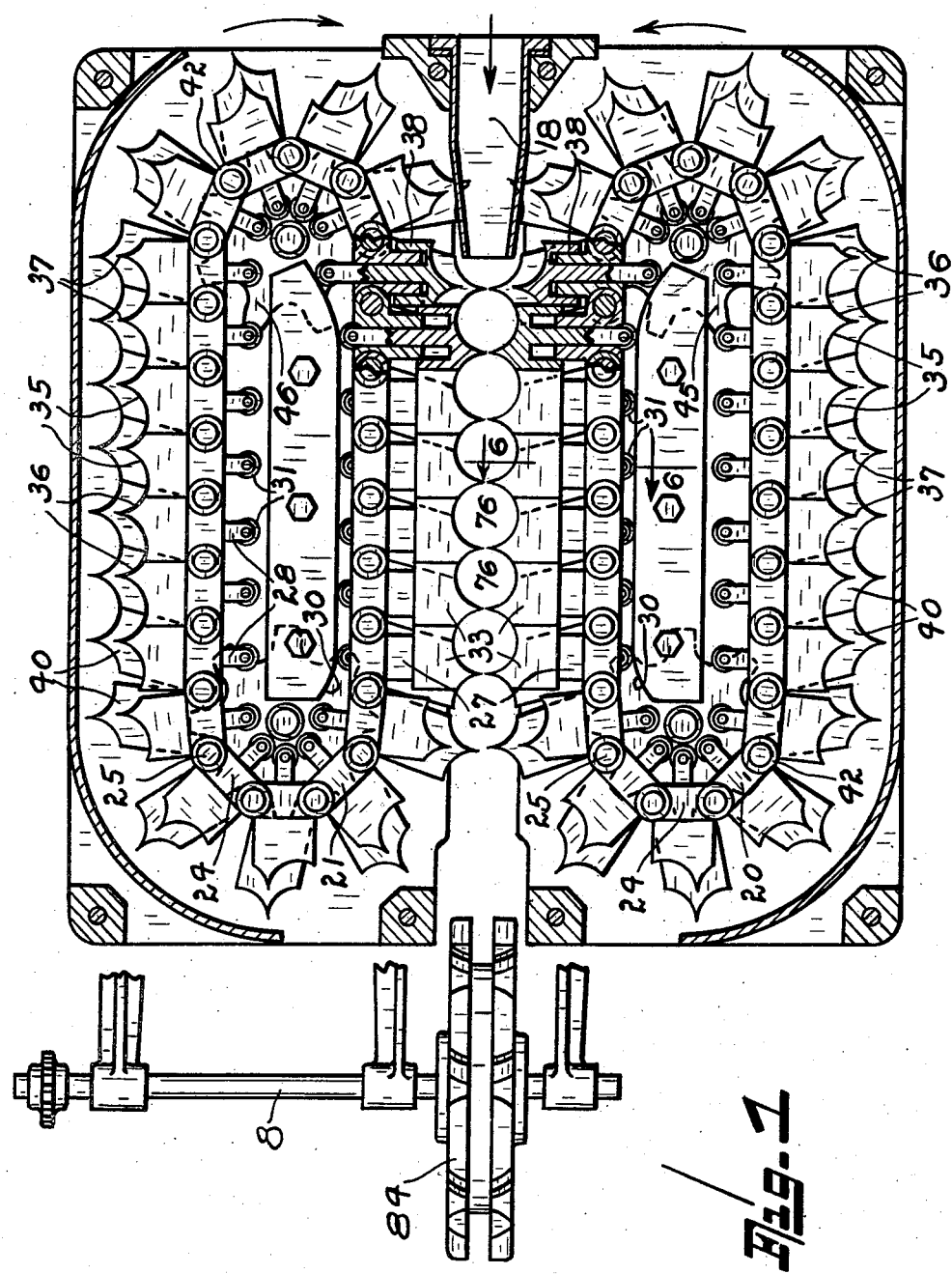

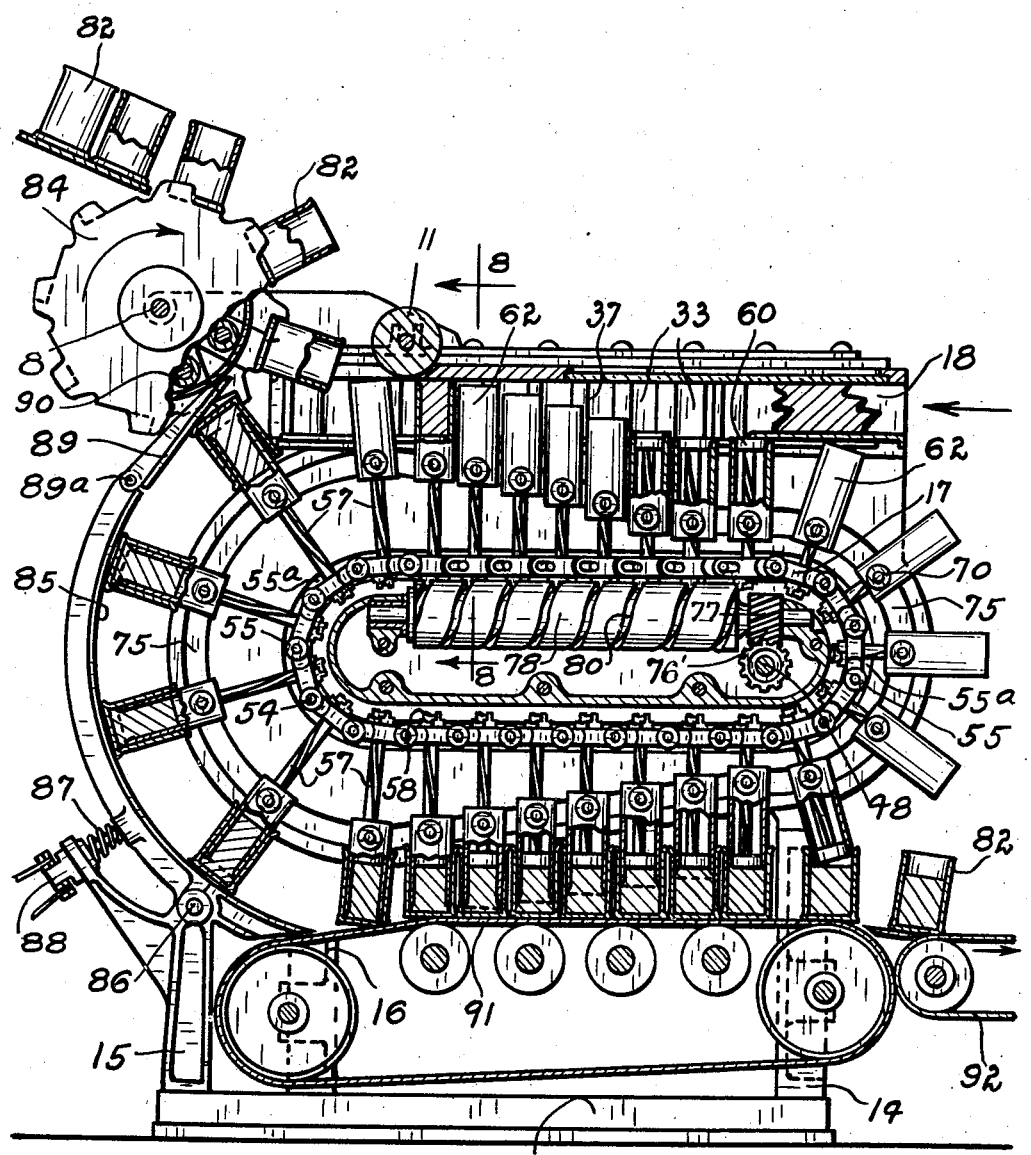

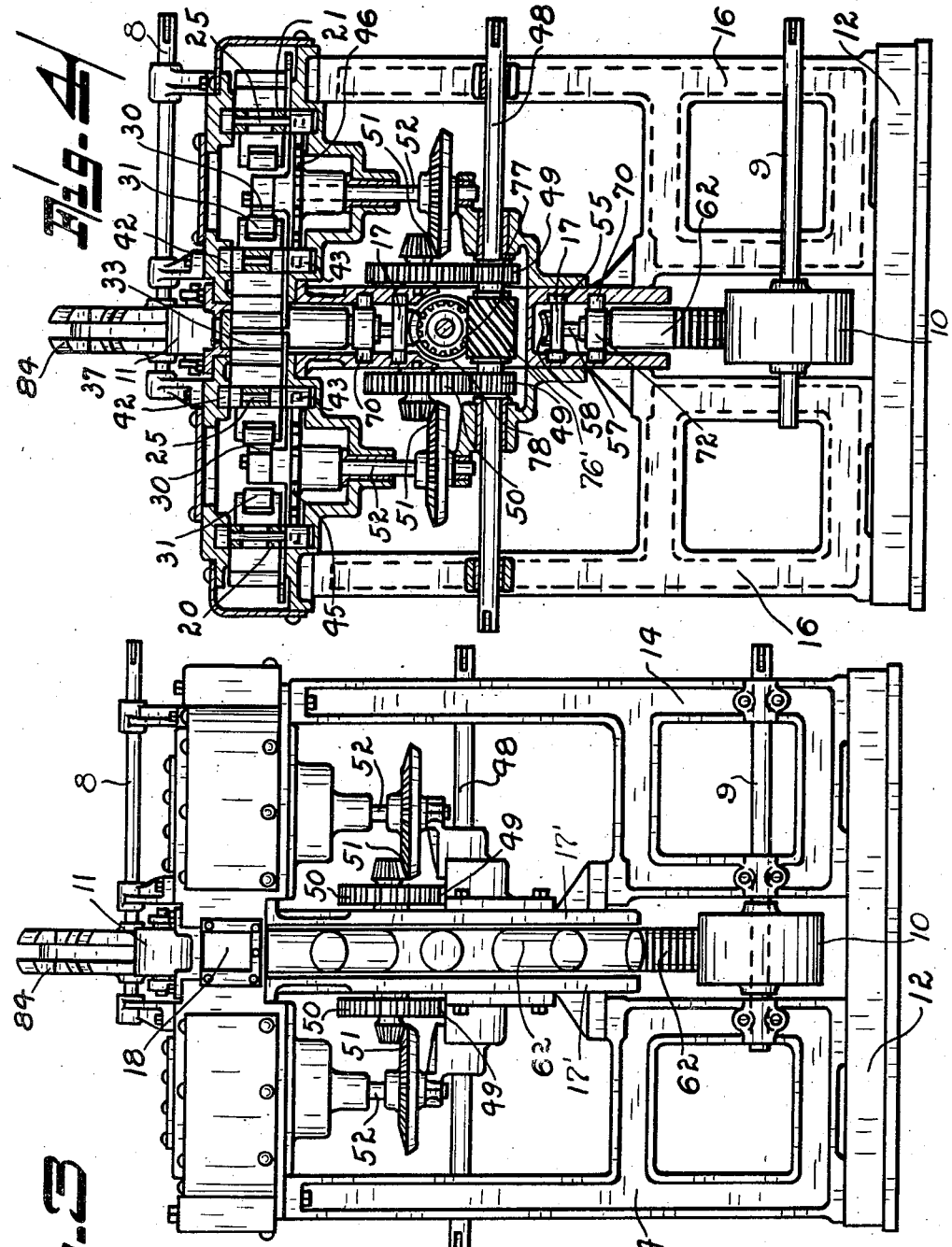

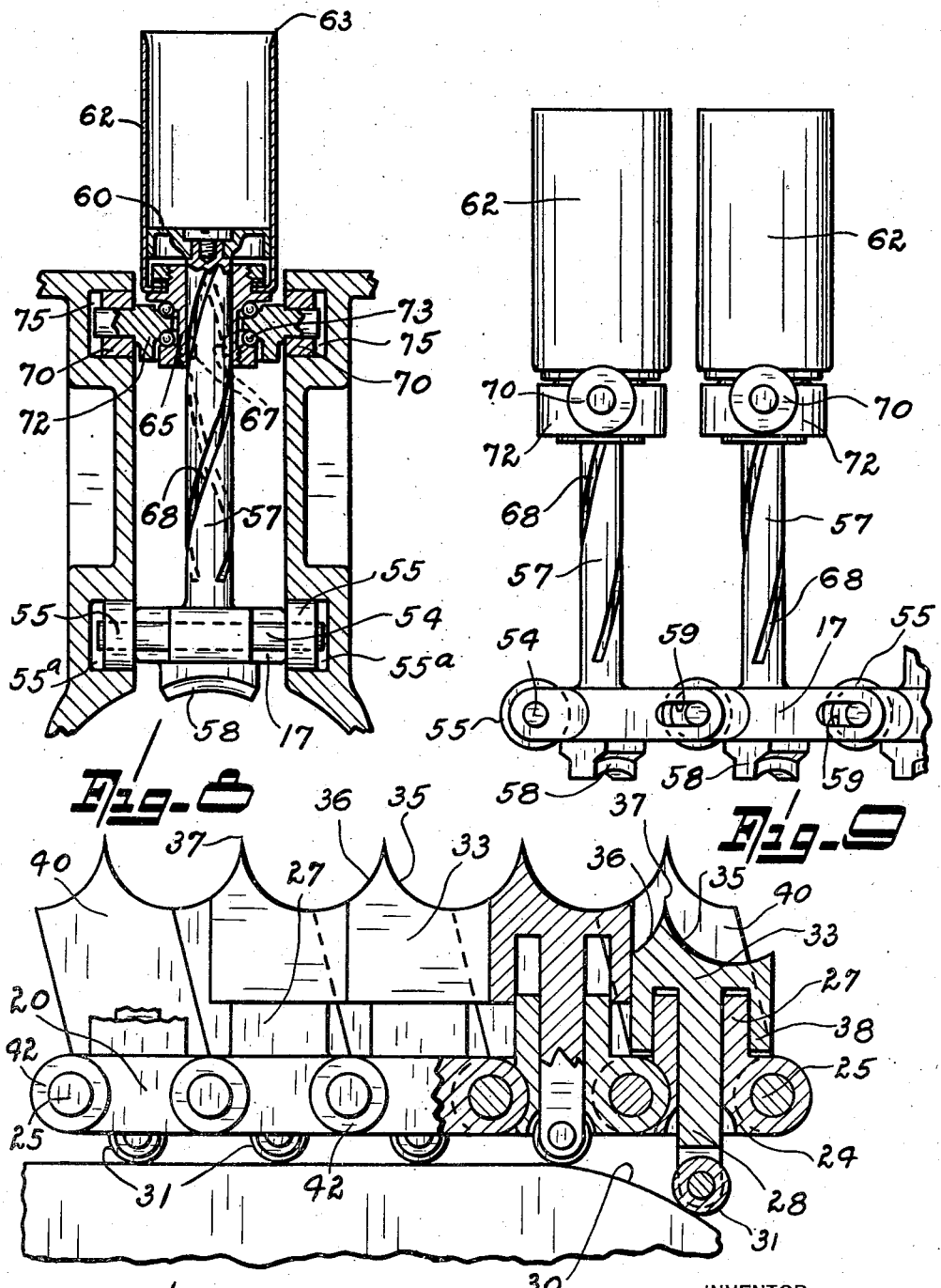

Patented July 8, 1941

2,248,311

UNITED STATES PATENT OFFICE 2,248,311

CAN FILLING MACHINE

Per F. Skoog, Bellingham, Wash.

Application June 27, 1939, Serial No. 281,446

13 Claims. (Cl. 226—101)

My present invention relates to the art of canning machinery and more particularly to can filling machines.

My device consists essentially of means for measuring, shearing, and compressing a predetermined amount of food, such as salmon, meat or the like, in a cylinder by progressive steps; thus my device carries the cylinder to a point where a can is placed over the cylinder and is charged, and then quickly carries the charge covered with the inverted can around and downwardly so that the can is placed on a conveyor belt right side up and the cylinder removed from the can after discharging the measured contents into the can. My device is so arranged that a large number of cans can simultaneously be going through various stages of this operation to the end that unusual capacity is obtained and a machine can thus be built, which will properly measure the solid and fill the cans at a greater rate than any equipment observed to date.

In the operations involved in the canning of fish, particularly salmon, and meats or the like, it has always been a problem to provide in the cannery a machine which will not serve as a bottle-neck for the operation, and it is therefore the principal object of my present invention to provide a machine that is capable of unusually high production.

Another difficulty encountered in canneries is to provide a shearing means which will retain its keenness and ability to cut the sometimes tough and slippery skin, particularly of salmon, and to maintain its keen edge during a reasonable period of operation. In my present equipment I have overcome this deficiency by providing a large number of cylindrical food chambers which in themselves are knives, provided with both longitudinal movement and shearing movement, which is imparted by a spiral arrangement. Each knife has only a small portion of the total number of cuts to make and can thus be maintained in a satisfactory keen condition.

Another object accomplished by my invention is the provision of means which assures that each can will be fully packed and will be delivered to the conveyor without danger of any of the small pieces rolling or falling out of the can.

A further object of my present invention is to provide a can filling machine which can be mechanically fed in contra-distinction to so many of the present can filling machines which must be manually tended. This provides a great measure of safety, and requires less attention, and consequently the machine can be operated more cheaply in practice.

A further object of my present invention is to provide a machine in which, owing to the fact that a large number of cans are going through the filling operation at the same time, each of the various parts involved can operate at relatively low speed so as to insure its proper functioning and long life. This is a matter of considerable moment, particularly in salmon canneries where the run of fish may be short, and especially inasmuch as the present salmon seasons are so short that if a cannery should fail, through mechanical failure, to pack its quota of fish when the fish are available, a very severe loss is inflicted, not only upon the cannery owners themselves, but in many instances upon their employees. This would even be a national loss as the fish must be disposed of after forty-eight hours.

Another object of my present invention is that, as the cans are being filled, no air can be trapped in the cans which is so objectionable to the conventional type of can filling mechanisms.

Other and more specific objects will be apparent from the following description taken in connection with the accompanying drawings, wherein Figure 1 is a top plan view of a can filling machine made after the teachings of my invention, with certain covering parts removed to better illustrate the construction of the machine.

Figure 2 is a sectional view taken through the longitudinal axis of my device, certain parts being broken away and others shown in section to better illustrate the construction.

Figure 3 is an end elevation of my machine taken from the right hand end of the machine as shown in Figure 2.

Figure 4 is a view similar to Figure 3, excepting the device is shown as broken away and certain parts shown in section to better illustrate the construction.

Figure 5 is a top plan view of my device with the cover plate in place to illustrate the manner of enclosing my device so as to maintain the sanitary condition so necessary in this field.

Figure 6 is a fragmentary, vertical, sectional view taken along the line 6—6 of Figure 1.

Figure 7 is an elevation of a portion of Figure 6 showing a portion of the food measuring and conveying mechanism.

Figure 8 is a vertical, sectional view taken at right angles to the plane of Figure 2, or as shown along the line 8—8 of Figure 2.

Figure 9 is an elevation showing in enlarged view two of the members used to support the shearing container member and to operate it in proper respect to the food supporting and expelling trip member.

Figure 10 is an enlarged detail view of a portion of Figure 1 to better illustrate the steps in forming the food measuring and conveying portions of my device.

Referring to the drawings, throughout which like reference characters indicate like parts, 12 designates the bed plate of my machine. This, for maximum rigidity, is normally a casting as are the various supporting frame members as 14, 15, and 16. These members support the various parts of my mechanism as will probably be best understood from a study of Figures 1, 2, 3, and 4. My machine consists essentially of the vertically disposed chain 17 and the assemblies associated therewith which convey the food and the cans through my device. The construction of these parts is probably best illustrated in Figures 2, 8, and 9. Associated with this mechanism are two horizontally disposed chain assemblies shown in Figures 1, 4, and 10, with details shown in Figures 6 and 7.

The food products are fed by some convenient means so as to supply the product under pressure into the feeding trough or nozzle 18. As the material enters it is discharged from this nozzle where it has been somewhat compressed due to the tapering discharge end of the nozzle, and the product is encased and compressed into a cylindrical form by the members probably most fully illustrated in Figure 10. These members are carried by the horizontally disposed chains illustrated in Figure 1, and consist of the chains as 20 and 21, which are formed with special link members 24, having the customary coupling pins 25. Each link member is provided with an outstanding guide or tubular boss 27, in which is adapted to reciprocate plunger 28. This plunger is longitudinally moved and positioned with respect to guideway 27 by the co-action of cam 30 and the cam follower or roller 31. The plunger 28 is fixedly secured or made a part of the compressor and conveying member 33. It will be noted from a study of Figure 1 that four of these members are required to encompass a single can charge. Consequently, each member 33 has two arcuate portions as 35 and 36, which are divided by the point 37. In order to provide rigidity and accurate placement of each member 33, I have provided that guideway 27 will be machined on its outside so that a machined skirt 38 of the member 33 fits neatly on the tubular boss or guide to insure rigidity in the reciprocating movement of the conveying member 33. It will be noted from Figure 10 that as the cam follower or roller 31 rides up cam 30, member 33 is forced outwardly or upwardly as shown in Figure 10, so that when four such members are forced fully out as in Fig. 1, they will substantially enclose, compress, and carry along a charge of fish, for instance.

Fixedly secured to each link member 24 is a bottom rest or guide plate 40 the free end of which is formed with the same arcuate curves as the movable member 33, so that, as will be observed in Figure 10, when member 33 moves fully out to its uttermost position it will lie directly above the curves of member 40. This construction is probably best illustrated in Figures 6 and 7. Each pin 25 of chains 20 and 21 has outwardly disposed extensions upon which are revolvably mounted rollers as 42 and 43, which are adapted to ride in guideway 42a and 43a, formed in the frame members of my device. This accurately positions the chains and the parts supported therefrom as they are carried through their cycle of operation by means of the driving sprockets 45 and 46. As best seen in Figure 1, the endless chain 20 passes around the pair of spaced horizontal sprockets 45, 45, and the complementary chain 21 passes around similar sprockets 46, 46, with the adjoining working flights of the chains in parallelism. In Figures 4 and 5 it will be seen that the driving mechanism for the chains includes a driving shaft 48 extending transversely of the machine, which shaft is journaled in the main frame, and operated from any convenient source of power. Two spaced drive pinions 49, 49 on the shaft 48 mesh with two larger gears 50, 50 mounted on stud shafts, and dual bevel gear couples 51, 51 transmit power to the two upright sprocket shafts 52, 52. This drive synchronizes the two chain assemblies 20 and 21 and assures that the various members will be moved together so as to form the necessary food compressing and conveying means.

Referring particularly to Figures 2, 8, and 9, the construction and operation of a single endless chain 17 and its associated parts for carrying the charges and conveying the charged cans will be best understood. The endless conveyer chain 17 is mounted centrally of the machine to travel in a vertical plane below the plane of the horizontally disposed conveyer chains 20 and 21, and chain 17 passes between spaced upright guide plates 17' which form part of the frame of the machine. Each of the link pins, 54, of the chain 17 projects laterally at both sides of the chain to form journals for pairs of guide rollers 55, and these rollers travel in endless grooves or guideways 55a fashioned in adjoining faces of the guide plates 17'. Each link of the chain 17 also has fixedly secured to it or formed as a part thereof an outwardly extending piston rod 57, and on the opposite inner side of the link an alined worm tooth 58. It is to be noted further that each link is provided with an elongated longitudinally extending pin slot as 59 so that the pitch of the chain can be changed for a purpose that will be more fully explained. At its outer end piston rod 57 is provided with a piston head 60 which has a snug working fit in a rotary cylinder 62 which forms both a charge-carrier and a can-conveyer, and the free edge 63 of the cylinder is beveled to form a shearing cutter for the charge of material being packed or canned. This rotary cylinder 62 is rigidly mounted on and turns with a bushing 65 having inwardly extending feed pins 67 which are adapted to engage diametrically opposed spiral grooves 68 cut in the surface of piston rod 57. This charge carrier and can-conveyer assembly is disposed to move up and down on rod 57 and that movement is controlled by the guide or cam follower rollers 70. These rollers 70 are journaled on laterally extending pins of a supporting ring 72, which serves as a carrier for a roller bearing 73 between the ring and bushing 65 so that a conveyer cup 62 may rotate freely about its axis with respect to the carrier 72. In Figure 8 I have illustrated a ball-bearing arrangement at 73, although it is to be understood that any suitable bearing may be used at this point. The oppositely arranged rollers 70, 70 travel in cam grooves 75, 75, which are formed in adjoining faces of the guide plates 17', and these complementary grooves follow the general plan shown in the elevation of Figure 2, the center line of these grooves following the line formed by the rollers 70 in the drawings.

It will be noted from a study of Figure 2 that the movement of the upper and lower flights of the chain 17, due to the arrangement of the guideways 55a, 55a, is in horizontal planes between the semicircular ends of these guideways. On the other hand, the guideways or grooves 75, 75 both have upper and lower inclines between the semi-circular ends of the guideways, and the semi-circular left end of each of these grooves 75, 75 has a substantially larger radius than semi-circular right end of each groove 75. This, then, causes each succeeding cylinder 62 to move outwardly as it progresses in the upper position from right to left in Figure 2. This provides the shearing action required so as to cut any skin or meat that might carry over from one charge forming cavity 76 to another in Figure 1. It is to be understood that cylinder 62 enters and forms a shearing fit with cavity 76 working as it does inside the same in its sequence of position. The rotary action created by spiral 68 on member 57 has been found to give a much improved shearing or cutting action over that which would be obtained if a straight reciprocating movement were to be given to cylinder 62. In this manner annular shearing knife-edge 63 will cut satisfactorily due to the slicing effect which is provided by the partial revolution, even though it may, in a period run, have lost its keen edge and would only tear were it not given this slicing effect.

It will be understood, it is believed, that it is very necessary to have accurate positioning of cylinders 62 with respect to the cavities 76 which are formed, as previously explained, by four of the charged forming conveyers 33. This is accomplished by providing that the same shaft 48, which operates chains 20 and 21, shall also drive the conveyer chain 17 through a worm 76' on shaft 48 and a spiral gear arrangement indicated at 77. The spiral gear 77 is rigid with a roll 78 journaled in suitable bearings and upon which a helical groove 80 is cut. Groove 80 is adapted to suitably engage the worm teeth 58 of conveyer chain 17, and by this means the pitch of chain 17 is reduced to the point where exact spacing of cylindrical conveyers 62 is obtained, assuring proper shearing action of the cutting edges 63 without danger to the keen cutting edges. The cutting edges must be brought into peripheral contact during their shearing cycle with the charge forming conveyers 33, and after leaving roll 78 the can-conveyers pass under a retaining guide roller 11 and are separated to permit the cans to slip over and onto the conveyers 62. As the three chains 17, 20 and 21 carry the charge of fish to the left as viewed in Figure 2, the cylindrical can conveyer 62 is released from the charge forming conveyers 33 at the left hand limit of its horizontal travel, and at this point a can 82 is carried into position with the open end down by means of a rotary carrier member 84. The can as it is placed over cylinder 62 is then engaged by an arcuate presser plate 85 which is pivoted at 86 and resiliently held in a fixed position against the closed end or bottom of the can by the compression spring 87. If a can jams, pressure plate 85 may move outwardly about pivot 86 against spring 87 will thereby operate an electric switch 88 that controls a suitable stop device (not shown) by means of which the operation of the machine is stopped, until the jam can be released. At the extreme free end of presser plate 85 an extension bar 89 is pivoted at 89a, the free end of which bar projects into a groove cut in wheel 84 after showing of Figure 2. If the presser plate 85 is moved outwardly by the jamming of a can, the flexible bar 89 will always remain in contact with wheel 84 to retain a can from displacement. The empty open-top-cans are held in feeding position on the periphery of the rotary feed-carrier 84 by the attraction of a series of electro-magnets 90 mounted on the carrier, and by the joint movement of the charge-conveyers 62 and the rotary carrier the charged conveyers are inserted in the cans. As the charged can is carried around the left hand end of assembly shown in Figure 2 it finally is delivered with its open top up onto a short conveyor belt 91. This belt is driven by power synchronized with the main drive and it discharges the packed cans onto the delivery belt 92. As the cans pass over the horizontal portion of belt 91 the can-conveyer assemblies are lifted from the cans due to the travel of rollers 70 up into the short-radius curves of the grooves 75. The pistons 60, however, remaining in their lower position, hold the charges of fish, or other food products, in the cans until a point is reached, as shown at right hand side of Figure 2, where the pistons are raised out of the cans and the cans are discharged to belt 92. The food product is thus pressed firmly into the bottom of the can so that full weight can be assured and the cover may be attached without interference of any protruding fish.

Power is supplied from a suitable source to worm shaft 48 which is synchronized with shaft 8 of the rotary carrier 84 and one of the shafts 9 of the pulleys 10 of the belt 91, and suitable transmission mechanism connects these shafts.

The foregoing description and the accompanying drawings are believed to clearly disclose a preferred embodiment of my invention, but it will be understood that this disclosure is merely illustrative and that such changes in the invention may be made as are fairly within the scope and spirit of the following claims.

I claim:

1. The combination in a canning machine, with a conveyer having a charge-forming cavity, and means for charging the cavity, of a conveyer chain located beneath said conveyer, a rod carried by said chain, a charge-carrying cylinder reciprocally mounted on said rod and adapted to enclose a charge in the cavity, and means for projecting the cylinder into said cavity.

2. The combination in a canning machine, with a conveyer having a charge-forming cavity, and means for charging the cavity, of a conveyer chain located beneath said conveyer, a rod carried by said chain, a charge-carrying cylinder movably mounted on the rod to enclose a charge in the cavity, said cylinder having a free annular cutting edge, and means for projecting the cylinder into said cavity.

3. The combination in a canning machine, with a conveyer having a charge forming cavity, and means for charging the cavity, of a conveyer chain located beneath said conveyer, a rod carried by said chain, a charge-carrying cylinder movably mounted on the rod to enclose a charge in said cavity, said cylinder having a free annular shearing edge, means for projecting the cylinder into the cavity and means for simultaneously turning the cylinder upon the rod as a center.

4. The combination in a canning machine, with a conveyer having a charge-forming cavity, and means for charging the cavity, of a conveyer located beneath the first conveyer, a rod carried by the second conveyer and a packing head on said rod, a charge-carrying cylinder mounted on said rod, enclosing said head, and adapted to enclose a charge in said cavity, and means for projecting said cylinder into said cavity.

5. The combination in a canning machine with a conveyer having a charge-forming cavity, and means for charging the cavity, of a pair of spaced guide plates located beneath the conveyer, a second conveyer mounted between said guide plates, a rod carried by the second conveyer, a charge-carrying cylinder movably mounted on said rod and adapted to enclose a charge in said cavity, and co-acting means between said cylinder and guide plates for projecting said cylinder into said cavity.

6. The combination in a canning machine, with a conveyer having a charge-forming cavity, and means for charging the cavity, of a pair of spaced guide plates located beneath the conveyer and a conveyer-chain located between said plates, a rod carried by the chain, a cylinder mounted on said rod, co-acting means between the cylinder and said plates for projecting the cylinder into said cavity, and co-acting means between the cylinder and said rod for simultaneously turning the cylinder within the cavity.

7. The combination in a canning machine with a pair of spaced guide plates, of a chain conveyer and co-acting means between the plates and chain conveyer for guiding the latter, of a rod mounted on the chain conveyer, a cylinder having a base-portion mounted on said rod, a supporting ring for said base-portion, and co-acting means on said ring and said guide plates for projecting the cylinder.

8. The combination in a canning machine with a pair of spaced guide plates each having a horizontal groove and a spaced inclined groove, of a chain conveyer having laterally disposed rollers traveling in the horizontal grooves, a rod mounted on the chain conveyer, a cylinder having a base-portion mounted on said rod, a supporting ring for the base portion, and said ring having laterally projecting guide rollers traveling in said inclined grooves.

9. The combination in a canning machine with a pair of spaced guide plates each having a horizontal groove and a spaced inclined groove, of a chain conveyer having laterally disposed rollers traveling in said horizontal grooves, a rod mounted on the chain conveyer and a packing head on the free end of said rod, a cylinder enclosing said head and mounted on the rod, a supporting ring for the cylinder, and said ring having laterally projecting guide rollers traveling in said inclined grooves.

10. The combination in a canning machine with a pair of spaced guide plates each having a horizontal groove and an inclined groove, of a chain conveyer having laterally disposed rollers traveling in said horizontal grooves, a rod mounted on the chain conveyer, a rotary bushing mounted on the rod and a cylinder having a free cutting edge and rigid with the bushing, a supporting ring and a bearing between said ring and bushing, said ring having laterally disposed rollers traveling in said inclined grooves, and co-acting means between the bushing and the rod for turning said cylinder.

11. The combination in a canning machine with a pair of spaced guide plates each having a horizontal groove and an inclined groove, of a chain conveyer having laterally disposed rollers traveling in said horizontal grooves, a rod mounted on the chain conveyer said rod having exterior spiral grooves, a bushing mounted on the rod and pins mounted on said bushing engaged in said grooves, a cylinder rigid with the bushing and having an annular shearing edge, a supporting ring and a bearing between said ring and the bushing, and laterally disposed rollers mounted on said ring and traveling in the inclined grooves.

12. The combination in a canning machine including a charge-conveyer having a row of charging cavities, of an endless chain conveyer including charge-carrying cylinders and means for projecting successive cylinders into successive cavities, means for releasing successive charged cylinders from the charge-conveyer, means for depositing an open end can upon each successive charged cylinder, and means for successively inverting the combined cylinders and cans, said means for projecting successive cylinders being adapted to successively withdraw said cylinders from the charged cans.

13. The combination in a canning machine including a horizontally moving charge-conveyer having a row of upright charge-carrying cavities, of a vertically arranged endless chain located below the charge-conveyer and including charge carrying cylinders, means for successively projecting the cylinders of the upper flight of the chain conveyer into complementary charged-cavities, means for releasing successive charged-cylinders from the charge-conveyer, means for depositing an open-end can upon successive charged-cylinders, and means for successively inverting the combined cylinders and cans, said means for projecting successive cylinders being adapted to withdraw said cylinders from the charged cans.

PER F. SKOOG.